Figure 1:
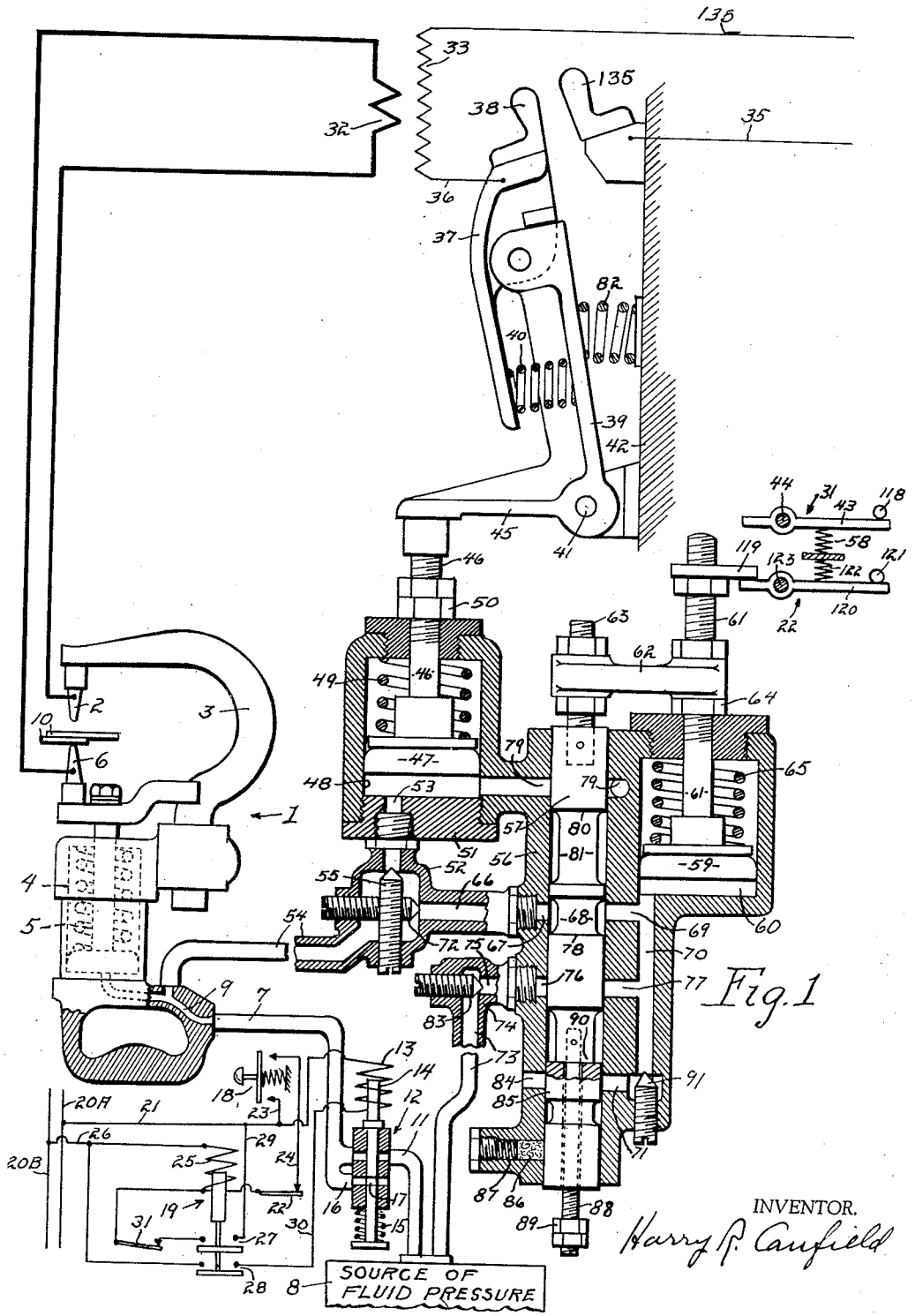

July 8, 1941.  H. R. CANFIELD  2,248,851
FLUID PRESSURE OPERATED CONTACTOR
Filed Sept. 30, 1937  3 Sheets-Sheet 1

INVENTOR.
Harry R. Canfield

July 8, 1941.   H. R. CANFIELD   2,248,851
FLUID PRESSURE OPERATED CONTACTOR
Filed Sept. 30, 1937   3 Sheets-Sheet 3

INVENTOR.
Harry R. Canfield

Patented July 8, 1941

2,248,851

UNITED STATES PATENT OFFICE 2,248,851

FLUID PRESSURE OPERATED CONTACTOR

Harry E. Canfield, Cleveland, Ohio, assignor to The Clark Controller Company, Cleveland, Ohio, a corporation of Ohio Application September 30, 1937, Serial No. 166,690

24 Claims. (Cl. 200—82)

This invention relates to fluid pressure operated apparatus and particularly to apparatus of this class adapted to the operation of electric contactors.

My invention may be applied to various uses in which an apparatus element is required to be moved a predetermined distance from a normal position with a timed movement and restored to normal position.

A particularly useful application of my invention is the pneumatic operation of an electric switch or contactor to control the welding current supplied to a welding device or gun.

It is desirable in such cases: to cause the contactor to close to initiate the current impulse, and after a predetermined time interval to open again to break the current thus measuring the duration of the welding current impulse; and to correlate the operation of the contactor with the movement or position of the electrodes of a welding gun or machine to insure that the electrodes will be fully engaged with the work when the current begins; and to cause the electrodes to remain engaged with the work being welded for a measured time interval after the welding current is broken; and to control the frequency at which successive impulses of welding current may follow each other; and in some cases, to control the frequency at which successive operations of the electrodes of the welding machine or gun may follow each other; and to insure that a complete cycle of operation for making a weld may be fully completed when once initiated; and to cause either a continuous succession of the welding cycles of operations to occur one after the other in rapid succession upon a single actuation of the apparatus, or to cause only a single cycle to occur after each actuation of the apparatus.

It is the primary object of this invention to provide an apparatus having some or all of the aforesaid characteristics of operation, and constructed and functioning in an improved manner to control a welding apparatus and the welding current supplied thereto.

Other objects are:

To provide a pneumatic apparatus having an improved valve control therefor;

To provide an apparatus of the class referred to having improved means to insure a desired predetermined sequence of a plurality of functions controlling the welding current supplied to a welding apparatus;

To provide an improved apparatus of the class referred to having improved means to insure a desired predetermined sequence of a plurality of functions controlling a welding machine or gun;

To provide an improved electric contactor for timing electric current impulses;

To provide an electric contactor operated by air pressure in a chamber and having improved means to sequentially admit air to and exhaust air from the chamber to time the closing and opening of the contactor to cause it to produce current impulses in an electric circuit, such for example, as a welding current circuit.

Other objects will be apparent to those skilled in the art to which my invention appertains.

Figure 2:
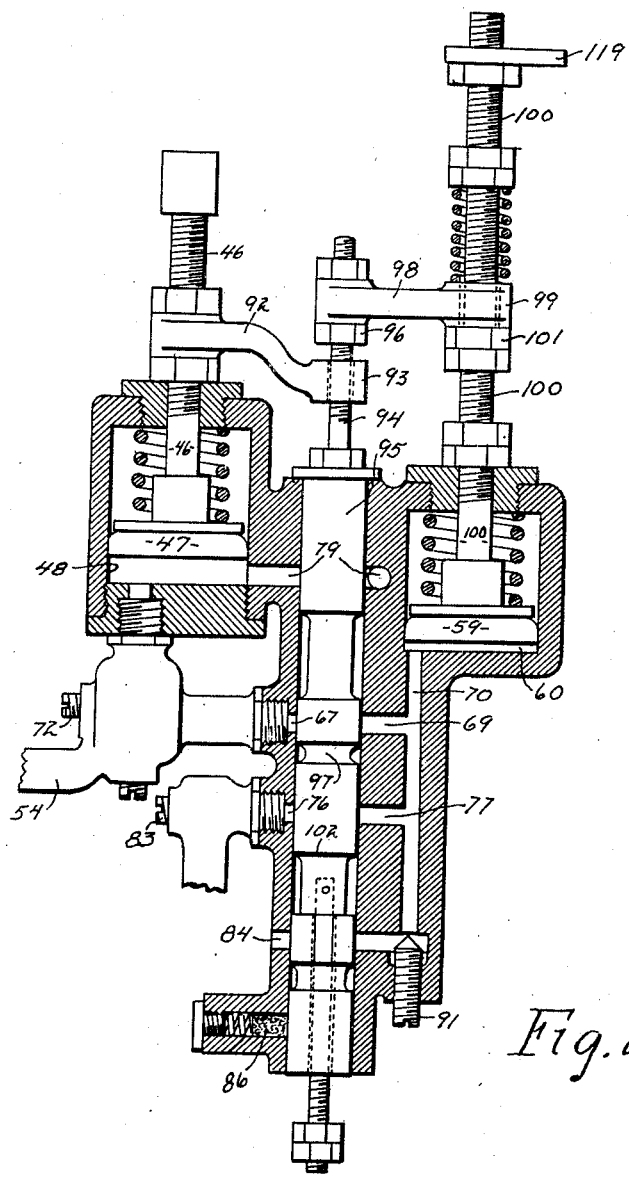
Figure 3:
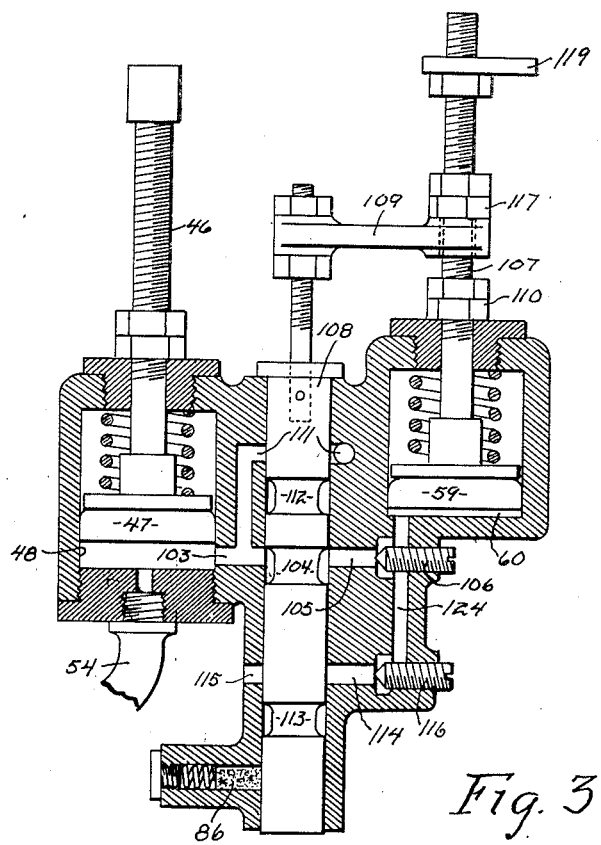

My invention is fully disclosed in the following description taken in connection with accompanying drawings in which, Fig. 1 is a view of an embodiment of my invention, the view being partly diagrammatic, illustrating in longitudinal section, parts of a pneumatically operated electric contactor, and illustrating associated therewith a welding gun and an electric circuit for supplying current to the gun under the control of the contactor, and illustrating also electro-pneumatic means for controlling the supply of fluid pressure from a fluid pressure source;

Figs. 2 and 3 are views, similar each to a part of Fig. 1, but illustrating modifications.

Referring to the drawings I have shown at 1 a welding gun or welding machine having a stationary electrode 2, supported on an arm 3 which is rigidly secured to a pneumatic cylinder 4. A piston 5 within the cylinder, shown in dotted line, has a piston rod projecting therefrom to which is secured a movable electrode 6. Fluid pressure such as compressed air is supplied to the gun by way of a conduit 7 from a source of fluid pressure 8 in a manner to be described, and flowing through a duct 9, enters the cylinder 4 and forces the piston 5 and electrode 6 outwardly to engage work pieces 10—10 between the electrodes 2—6 with pressure.

The compressed air is supplied from the source 8 to the conduit 7 through a conduit 11 under the control of a magnetic valve illustrated generally at 12 and comprising an electro-magnetic winding 13 arranged to lift a plunger 14 against the tension of a restoring spring 15. With the parts in the normal position illustrated, compressed air in the conduit 7 and therefore in the cylinder 4 may exhaust backwardly through the conduit 7 and through a branch conduit 16 and through a port 17 in the plunger 14 to atmosphere. When the winding 13 is energized the plunger 14 is raised and the port 17 moves to a position in alignment with the conduits 11 and 7 cutting off the exhaust and effecting communication with the source 8.

An operator's push button 18 is arranged to energize the winding 13 through a relay shown generally at 19 in the following manner.

Upon pressing the push button 18 current is supplied from a main 20A through a wire 21 and a wire 23 to one contact of the push button, and from the other contact of the push button the current flowing by a wire 24 and a switch 22, to be referred to, through the winding 25 of the relay and by a wire 26 to the other main 20B.

This operates the relay 19 causing it to close two sets of contacts 27 and 28. The contacts 27 bridge the push button contacts by a circuit comprising a wire 29 and a switch 31 to be referred to, so that when the push button is released the relay stays closed; and the contacts 28 close a circuit through the winding 13 of the magnetic valve 12, the current flowing by the wire 21 as before to one end of the winding, thence through the winding 13 and back by the wire 30 to the switch 28, to the wire 26 and thence to the main 20B.

This arrangement therefore is such that upon a momentary closing of the push button 18, the relay is operated and makes a maintaining circuit for itself and energizes the magnetic valve. To de-energize the relay and close the valve 12, the switch 31 is provided, which when opened in a manner to be described restores the parts just described, putting them back again under the control of the push button.

When the welding gun 1 is operated as just described to engage the electrodes 2 and 6 with the work pieces 10, current may be supplied, to effect the weld in the work, from the secondary 32 of a transformer having a primary 33, one side of the primary being connected to a current supply line 135 and the other side being connected by a wire 36 to a switch arm 37 and thereby to a switch contact 38, the other current supply line 35 being connected to another contact 34.

The switch arm 37 is pivoted on a main arm 39 being rendered yieldable upon engagement of the contacts by a spring 40 in a well known manner, the main arm 39 being pivotally supported at 41 upon a panel 42. The switch arm 39 has a horizontal extension 45 resting upon the upper end of a vertical piston rod 46. By upper reciprocation of the rod 46, the switch contacts 38 and 34 are engaged for the purposes described, as will be understood.

The piston rod 46 has on the lower end thereof a piston 47 reciprocable in a cylinder 48 and is constrained to move downward by a spring 49 and is stopped in a final downward position by a stop 50 on the piston rod externally of the cylinder.

The lower end of the cylinder 48 is closed by a plug 51 into which is threaded a valve housing 52 the interior of which communicates through a port 53 with the interior of the cylinder 48 below the piston 47, the interior also communicating by a conduit 54 with the duct 9 of the welding gun above described.

By this arrangement when compressed air is supplied to the gun 1 through the duct 9 to move the electrode 6 as described, the yielding of the piston 5 in the gun maintains the air pressure in the duct 9 below its ultimate pressure value; and after the electrodes 6 and 2 engage the work, this pressure builds up to a higher value and is communicated through the conduit 54 to the cylinder 48; and when it reaches a sufficiently high pressure value, is sufficient to overcome the spring 49 and move the piston 47 upwardly, to operate the switch.

The rate of movement of the plunger 47 may be controlled by a needle valve 55 controlling the flow through the port 53, if such control is desired.

The contacts 38 and 34 of the contactor are thus closed when air from the gun 1 is communicated to the cylinder 48 and they will be held closed as long as the pressure is maintained in the cylinder. To open them after a predetermined time interval to time the current, the cylinder 48 is exhausted by apparatus which will now be described.

Adjacent the cylinder 48 is a valve housing 56 in which is reciprocable a piston valve 57. The piston valve is arranged to be lifted by the upward movement of a control piston 59 reciprocable in a cylinder 60 and having a piston rod 61 connected externally of the cylinder by an arm 62 to a stem 63 on the upper end of the valve 57. Preferably the arm 62 is rigidly secured at opposite ends to the piston rod 61 and to the valve 57.

The piston 59 is normally supported by a stop 64 on the rod 61 and is constrained to move downwardly by a spring 65 within the cylinder. The arm 62 supports the valve 57.

When air is admitted as above described to the main cylinder 48 from the housing 52, it is also admitted from the housing 52 through a conduit 66 to a valve port 67, the air flowing out of the port and around a neck 68 on the valve and out at a duct 69 whence it flows by a duct 70 to the cylinder 60.

The piston 59 is thereby moved upwardly and its rate of movement is controlled by a needle valve 72 in the housing 52 at the entrance to the conduit 66.

As the piston 59 moves upwardly it moves the valve 57 with it at a timed rate determined by the adjustment of the needle valve 72. After it has moved a suitable distance, it effects communication to the cylinder 60 directly from the source of fluid pressure, the compressed air flowing from the source by a conduit 73 to a valve housing 74 and thence through a conduit 75 through a port 76 which in the normal position of the valve was cut off from communication with a duct 77 leading into the duct 70, but which, now that the valve 57 has moved upwardly, has communication therewith, and supplies air to the cylinder 60.

At about the time that the valve opens the port 76, it closes the port 67 by means of the shoulder 78 at the lower end of the neck 68, and also opens an exhaust port 79 leading from the main cylinder 48, the port 79 being uncovered by the shoulder 80 at the upper end of a neck 81 on the valve.

The piston 47 is now returned downwardly by the spring 49, and the switch contacts 34 and 38 are opened by a switch arm spring 82, reacting upon the panel 42 and upon the switch arm 39. The piston 59 however continues to move upwardly being supplied by air through the conduit 75 and its rate of movement is controlled by a needle valve 83 at the entrance to the conduit 75.

The cylinder 60 is provided with an exhaust passageway by way of the duct 70 and a duct 71, and an outlet port 84, the port being covered by a portion 85 of the valve which is detached from the main portion 57 above it. The portion 85 is normally held in position to close this exhaust passageway by a friction pad 86 pressing against one side of the valve under the pressure of a spring 87. A stem 88 on the lower end of the main valve portion 57 extends downwardly through the valve portion 85. After a suitable time interval and corresponding movement of the piston 59 under control of the needle valve 83, a stop 89 on the lower end of the stem 88 engages the lower end of the valve portion 85 and moves it upwardly opening the exhaust port 84 and exhausting the cylinder 60 under control of a needle valve 91. At this time, the lower end 90 of the main valve portion 57 is spaced upwardly from the upper end of the valve portion 85.

The piston 59 is now moved downwardly by the spring 65 and moves the valve 57 with it closing off the exhaust 79 from the main cylinder and restoring the control for the cylinder 60 to the needle valve 72, and the lower end 90 of the main valve portion engages the valve portion 85 and moves it downwardly to close off the exhaust port 84 for the cylinder 60.

The parts are now in their original positions and if the relay 19 were to remain in its operated position, the main piston 47 would again move upwardly and close the switch and give another impulse of current to the electrodes, but when it is desired to avoid this, the switch 31 above referred to in the circuit of the winding 25 of the relay is opened by the upward movement of the piston rod 61 at the upper limit of its movement. The switch comprises an arm 43 pivotally supported at 44 and pressed by a spring 58 into engagement with a contact 118. A finger 119 on the piston rod 61 rocks the arm 43 to disengage the contact.

This switch 31, illustrated structurally above the piston rod 61, is reproduced diagrammatically in association with the relay 19 to avoid the complication of a wiring diagram making connection to the structural representation of the switch.

When switch 31 is opened, at the upper end of the stroke of the piston 59 and the valve 57, the relay 19 opens which de-energizes the magnetic valve winding 13, causing the valve to move to shut off the source of fluid pressure 8, and to exhaust the gun 1, and the cylinder 48, so that by the time the piston 47 has returned downwardly to open the switch contacts, the air supply has been cut off through the agency of the switch 31, and the piston remains down and the switch remains open.

It will be observed that the piston 47 cannot move upwardly to close the switch contacts 38 and 34 until the electrodes 2 and 6 of the welding gun have fully engaged the work because not until then will the pressure in the cylinder 48 be sufficient to raise the plunger against the tension of the spring 49. If further delay is wanted it may be provided by adjusting the screw 55.

The period of time during which the contacts 38—34 remain engaged may be adjustably varied by the valve screw 72 which controls the rate at which air is admitted to the cylinder 60 under the piston 59.

After the piston 59 has moved a predetermined distance, and the air is exhausted from the cylinder 48, the piston 47 returns and the contacts 38—34 open but the electrodes 2—6 remain engaged with the work because the magnetic valve 12 remains operated. This holding of the electrodes engaged with the work after performing a weld and after the welding current is cut off is sometimes referred to as "cold hold," and is desirable in some classes of spot welding for well known reasons. This cold hold time is determined by the adjustment of the valve screw 83 which controls the continued upward movement of the piston 59 until it operates the switch 31 to effect opening of the relay 19 and closing of the valve 12, causing the valve 12 to exhaust the gun 1 and allow the electrodes 2—6 to open terminating the cold hold. The piston 59 then returns downwardly, exhausting through the ducts 70 and 71, and out at the port 84 as described, under the control of the valve screw 91, which controls the velocity at which the piston 59 returns.

When the piston 59 has fully returned, it closes a switch 22, comprising an arm 120 normally held away from a contact 121 by a spring 122 and pivotally supported at 123. The finger 119 rocks the switch arm to engage the contact. This switch (like switch 31 referred to) is reproduced diagrammatically in association with the relay 19. Not until this switch is closed is it again possible to start another cycle of operations and the valve screw 91 therefore controls the frequency with which successive operations can be performed.

The next operation is performed by again pushing the push button 18; but it will be apparent that if the push button 18 were to be held closed, then at each completion of one cycle and closure of the switch 22 by the piston 59 at the bottom of its stroke, another cycle would immediately begin and the apparatus therefore would repeat continuously.

The form of my invention illustrated in Fig. 2 is in general, similar to that illustrated in Fig. 1, except that in this form the admission of air to the cylinder 60 is under the control of the piston 47. When the piston 47 and its piston rod 46 are moved upwardly, an arm 92 rigidly secured thereto moves upwardly therewith, and the free end 93 of the arm loosely encircles a stem 94 secured to the upper end of the valve 95. At a suitable point in the upward stroke of the piston 47, the free end 93 of the arm 92 engages a stop 96 on the valve stem and raises the valve 95. This causes a neck 97 on the valve to come opposite a port 67, corresponding to the port 67, described for the first form, whereupon air is admitted to the cylinder 60 through the ducts 69 and 70, and the piston 59 moves upwardly under the control of the valve screw 72.

An arm 98 is rigidly secured to the stem 94 above the stop 96 and has a free end 99 loosely encircling the piston rod 100 of the piston 59 and it moves upwardly freely thereover when the valve stem 94 rises as above described. As the piston 59 moves upwardly, a stop 101 thereon ultimately engages the free end 99 of the arm 98 and again starts upward movement of the valve 95. This movement causes the neck 97 on the valve to pass beyond the port 67 cutting off the supply of air through the port and causing a shoulder 102 on the valve to open a port 76, corresponding to the port 76 described for the first form, whereby air is admitted through the ducts 77 and 70 to the cylinder 60 to continue its movement upwardly under the control of the needle screw 83. Continued upward movement of the valve 95 by the piston 59 ultimately exhausts the cylinder 48 through the duct 79, and exhausts the cylinder 60 through the port 84 causing it to return under the control of the valve screw 91, all as described in connection with the first form.

Switches 31 and 22 may be provided operated by the finger 119 on the upper end of the piston rod 109 in the same manner as the corresponding switches were operated by the piston rod 61 in the first form.

It will be observed that in the first described form, air is admitted at once to the cylinder 60, and if the valve screw 72 is carelessly adjusted, the piston rod 61 may rise and cut off the control before the piston 47 has actually closed the contacts 33—34.

In the form of Fig. 2, however, air to the cylinder 60 is not admitted through the port 67 until after the piston 47 has made a substantial movement or has actually closed the contacts 38—34, and by its movement moves the valve initially high enough to open the port 67. Thereafter the control of the valve is taken over by the piston 59 as described for the first form.

All of the features of operation of the first described form may be had with that of Fig. 2.

In the form of Fig. 3, a simplified structure is shown in which the cold hold time interval is omitted.

Air is admitted through the conduit 54 to the cylinder 48 and raises the piston 47 to operate the main switch contacts by the piston rod 46, and air, at the same time, flows out of the cylinder 48 through a duct 103 and around a neck 104 on the valve through ducts 105 and 124 to the cylinder 60 under the control of a valve screw 106. The piston 59 therefore moves up concurrently with the piston 47 but at such a rate that the first piston may close the switch contacts 34—38 before the rod 107 on the piston 59 has moved far enough to open the switch 31. The valve 108 has an arm 109 rigidly connected thereto a free end of which loosely encircles the piston rod 107. Near the top of the stroke of the piston 59, a stop 110 on the piston rod 107 engages the arm 109 and moves it and the valve 108 upwardly to an upper position at which the cylinder 48 exhausts by way of the duct 103, and a port 111 around a neck 112 on the valve; and the neck 104 is moved up sufficiently to cut off air from the duct 103; and a neck 113 on the valve is moved up sufficiently high so that the cylinder 60 may exhaust through ducts 124 and 114 and out at a port 115, under the control of a valve screw 116. The valve is held in its upper position by a friction pad 86 as above described in connection with Fig. 1. The cylinders 48 and 60 being exhausted, the pistons 47 and 59 return. At or near the end of the stroke of the piston 59, a stop 117 on the piston rod 107 engages the upper side of the arm 109 and moves the valve 108 downwardly to its original position.

In this form, as will be apparent, the length of the current impulse may be adjustably varied by the valve screw 106 and the frequency between cycles may be varied adjustably by the valve screw 116. The cylinder 48 receiving air through the conduit 54 cannot operate the main switch contacts until after the welding machine electrodes are fully engaged as was described above.

For simplicity, the main switch and the electric circuits of Fig. 1 have been omitted from Fig. 2 and Fig. 3 in the belief that they will be sufficiently well understood from the more complete description of the first described form and by the use of the same reference characters on the different figures, wherever possible.

The finger 119 in Figs. 2 and 3, as will be understood, operates switches 22 and 31, not shown, for the purposes described for these switches in connection with Fig. 1.

My invention is not limited to the exact details of construction illustrated and described.

Changes and modifications may be made within the spirit of my invention without sacrificing its advantages and within the scope of the appended claims.

I claim:

1. In an electric switch mechanism, a normally open electric switch, an expansible and contractable walled chamber having a pressure movable wall arranged to move and close the switch when fluid pressure is supplied to the chamber and to hold it closed so long as the fluid pressure is maintained in the chamber, and fluid pressure responsive means to exhaust pressure from the chamber to effect restoring of the switch after a predetermined time interval following closure of the switch.

2. The switch mechanism described in claim 1, and in which means is provided to adjustably delay the exhausting of the chamber and the corresponding restoring of the switch to adjustably vary the time interval during which the switch remains closed.

3. In a fluid pressure operated switch mechanism, an electric switch, a fluid pressure operable means to operate the switch, a fluid pressure movable means effective to restore the fluid pressure operable means to effect restoring of the switch after a predetermined time interval following operation of the switch, and to restore itself.

4. In a fluid operable switch mechanism, an electric switch biased to open position by resilient means, a fluid pressure operable means operable to close the switch and hold it closed, a fluid pressure movable means effective to restore the first fluid pressure operable means and to permit the resilient means to open the switch after a predetermined time interval following closure of the switch and to restore itself.

5. The mechanism described in claim 4, and in which means is provided to adjustably delay the restoring of the fluid pressure operable means by the fluid pressure movable means to adjustably vary the time interval during which the switch remains closed.

6. The mechanism described in claim 4, and in which means is provided to adjustably delay the restoring of the fluid pressure movable means.

7. The mechanism described in claim 4, and in which an auxiliary electric switch is provided operable by the fluid pressure movable means and means is provided to delay operation of the auxiliary switch until after opening of the first named electric switch.

8. In an electric switch mechanism for controlling the welding current supplied to a welding machine or the like, a normally open electric switch, a first fluid pressure cylinder, a piston therein movable to close the switch when fluid pressure is supplied to the cylinder, a second fluid pressure cylinder and a second piston therein, a valve comprising a valve element movable by the second piston when fluid pressure is supplied to the second cylinder, the valve being arranged to move to exhaust both cylinders to effect restoring of both pistons and restoring of the switch by the first piston.

9. The mechanism described in claim 8, and in which means is provided to adjustably retard the supplying of pressure to the second cylinder to adjustably retard movement of the second piston and valve to adjustably change the length of time during which the switch remains closed.

10. In an electric switch mechanism, a normally open electric switch, an expansible and contractable walled chamber having a pressure movable wall arranged to move and close the switch when fluid pressure is applied to the chamber and to hold it closed so long as the fluid pressure is maintained in the chamber, and fluid pressure operable valve means operable to exhaust pressure from the chamber to effect restoring of the switch after a predetermined time interval following closure of the switch.

11. The switch mechanism described in claim 10 and in which means is provided to adjustably delay the operation of the fluid pressure operable valve means to adjustably delay the exhausting of the chamber and the corresponding restoring of the switch to adjustably vary the time interval during which the switch remains closed.

12. In an electric switch mechanism, a normally open electric switch, an expansible and contractable walled chamber having a pressure movable wall arranged to move and close the switch when fluid pressure is applied to the chamber and to hold it closed so long as the fluid pressure is maintained in the chamber, and fluid pressure operable means comprising means to retard its operation to effect exhaust of pressure from the chamber to effect restoring of the switch after a time period of retarded operation.

13. In a fluid pressure operable switch mechanism, an electric switch, a first fluid pressure operable means to operate the switch, a second fluid pressure operable means operable to restore the first fluid pressure operable means to effect restoring of the switch, and to restore itself, means to delay restoring of the switch for a predetermined time interval following operation of the switch and means to delay restoring of the second fluid pressure operable means.

14. In a fluid pressure operable switch mechanism, an electric switch, fluid pressure operable means to operate the switch, a fluid pressure operable valve means operable to exhaust fluid pressure from the fluid pressure operable means to effect restoring thereof and to thereby effect restoring of the switch after a predetermined time interval following operation of the switch and to restore the valve means itself, and means to delay restoring of the valve means.

15. In an electric switch mechanism, a normally open electric switch, an expansible and contractable walled chamber having a pressure movable wall arranged to move and close the switch when fluid pressure is applied to the chamber and to hold it closed so long as the fluid pressure is maintained in the chamber, and fluid pressure operable means comprising means to retard its operation and its restoring to effect exhaust of pressure from the chamber to effect restoring of the switch after a time period of retarded operation and to effect restoring of the fluid pressure operable means after a time period of retarded restoring.

16. In a fluid pressure operable switch mechanism, an electric switch, fluid pressure operable means to operate the switch and hold it operated, retarded-operation fluid pressure operable valve means effective after a time period of retarded operation to effect exhausting of pressure from the fluid pressure operable means to effect restoring thereof and restoring of the switch.

17. In a fluid pressure operable switch mechanism, an electric switch, a fluid pressure source, a first fluid pressure operable means operable by source pressure to operate the switch, retarded fluid pressure operable means operable to restore the first fluid pressure operable means to effect restoring of the switch after a time period of retarded operation, the retarded fluid pressure operable means being arranged to have continued retarded operation after operating to restore the first fluid pressure operable means, and source pressure controlling means operated responsive to said retarded fluid pressure operable means after a time period of continued retarded operation thereof.

18. In a fluid pressure operable switch mechanism, an electric switch, a first fluid pressure operable means to operate the switch, a retarded fluid pressure operable valve means operable to exhaust pressure from the first fluid pressure operable means to effect restoring thereof and restoring of the switch after a time period of retarded operation, the valve means being arranged to have continued retarded operation after operating to restore the first fluid pressure operable means, and auxiliary switch means operated by said valve means after a time period of continued retarded operation.

19. In a fluid pressure operable switch mechanism, a source of fluid pressure, a normally open electric switch, an expansible and contractable fluid pressure chamber having a pressure movable wall arranged to move to close the switch when fluid pressure is supplied to the chamber and to hold it closed so long as the fluid pressure is maintained in the chamber, a fluid pressure responsive means to exhaust fluid pressure from the chamber to effect restoring of the switch after a predetermined time interval following closure of the switch, conduit means communicating with the pressure source and with the chamber and fluid pressure responsive means, a magnetic valve operable to admit fluid pressure from the source to the conduit means, an electric circuit and an auxiliary switch operable to effect restoring of the magnetic valve, the auxiliary switch being operable by the fluid pressure responsive means after effecting exhaust of pressure from the chamber.

20. In a fluid pressure operable electric switch mechanism, a source of fluid pressure, a normally open electric switch, an expansible and contractable fluid pressure chamber having a fluid pressure movable wall arranged to move to close the switch when fluid pressure is applied to the chamber and to hold it closed so long as the fluid pressure is maintained in the chamber, retarded-operation fluid pressure responsive means operable to exhaust fluid pressure from the chamber to effect restoring of the switch after a time period of retarded operation, conduit means communicating with the source and with the chamber and fluid pressure responsive means, a magnetic valve operable to admit fluid pressure from the source to the conduit means, an electric circuit and an auxiliary switch operable to effect restoring of the magnetic valve, the fluid pressure responsive means being arranged to have continued retarded operation after effecting exhaust from the chamber, and the auxiliary switch being operable by the fluid pressure responsive means after a time period of continued retarded operation.

21. The mechanism described in claim 8 and in which means is provided to adjustably retard the restoring of the second piston.

22. The mechanism described in claim 20 and in which means is provided to adjustably retard restoring of the fluid pressure responsive means.

23. In a fluid pressure operable switch mechanism, an electric switch, a fluid pressure operable means to operate the switch, a retarded fluid pressure operable means effective after a first time period of retarded operation to restore the first fluid pressure operable means to thereby effect restoring of the switch, and an auxiliary switch operated by the retarded means after a second time period of retarded operation thereof.

24. In a fluid pressure operable switch mechanism, an electric switch, a fluid pressure operable means to operate the switch, a retarded fluid pressure operable means effective after a first time period of retarded operation to restore the first fluid pressure operable means to thereby effect restoring of the switch, an auxiliary switch operated by the retarded means after a second time period of retarded operation thereof, and means to retard restoring of the retarded means.

HARRY R. CANFIELD.